United States Patent [19]
Bloome et al.

[11] Patent Number: 5,307,685
[45] Date of Patent: May 3, 1994

[54] PRESSURE TESTER AND METHOD OF TESTING THEREWITH

[75] Inventors: James A. Bloome, Blue Grass; Lee M. White, Davenport, both of Iowa

[73] Assignee: BWI KartridgPak Co., Davenport, Iowa

[21] Appl. No.: 874,195

[22] Filed: Apr. 24, 1992

[51] Int. Cl.$^5$ .......................... G01L 7/00; G01M 3/04
[52] U.S. Cl. ........................................ 73/756; 73/45.4; 73/49.2
[58] Field of Search ................... 73/714, 756, 49.2 R, 73/49.3, 45.4, 52, 40

[56] References Cited

U.S. PATENT DOCUMENTS

| | | | |
|---|---|---|---|
| 1,971,065 | 8/1934 | Dieter | 73/49.2 R |
| 3,091,958 | 6/1963 | Robins | 73/49.2 R |
| 3,958,448 | 5/1976 | Willis et al. | 73/49.2 R |
| 4,096,736 | 6/1978 | Moshier | 73/40 |
| 4,378,692 | 4/1983 | Walle | 73/49.2 R |
| 4,722,230 | 2/1988 | Krohn | 73/714 |
| 4,754,648 | 7/1988 | Byrd et al. | 73/756 |

FOREIGN PATENT DOCUMENTS 1441963 7/1965 France ................. 73/45.4

OTHER PUBLICATIONS

The Kartridg Pak Co. Pressure Filler Service Manual, pp. 29, 41 and 58 dated Sep., 1988.

*Primary Examiner*—Richard E. Chilcot, Jr.
*Assistant Examiner*—William L. Oen
*Attorney, Agent, or Firm*—Lockwood, Alex, FitzGibbon & Cummings

[57] ABSTRACT

Apparatus for, and method of, through-the-valve testing the pressure levels within pressurized containers, particularly aerosol containers, without dispensing the container contents. The apparatus includes a vertically reciprocal head in which a small charge of gas under greater pressure than the highest pressure level to be tested for is isolated in a small chamber. The head is lowered onto a container being tested and an adapter on the bottom of the head interfaces with the valve on the container. The pressure of the charge in the head is released into the adapter and the container valve is actuated to provide a connection between the container pressure and the higher pressure in the head and adapter. Due to its small volume the pressure in the head and adapter readily equalizes to the level of the pressure in the container. This equalized pressure is sensed by a pressure sensor or transducer connected to the chamber in the head.

22 Claims, 6 Drawing Sheets

PRESSURE TESTER AND METHOD OF TESTING THEREWITH

BACKGROUND AND DESCRIPTION OF THE INVENTION

1. Field of the Invention

This invention relates, generally, to an apparatus for, and a method of testing the pressure levels within pressurized containers such as aerosol containers, without dispensing the contents therefrom.

2. Description of the Related Art

As is generally known, a wide variety of products are dispensed in aerosol form from containers pressurized with suitable propellants. Products packaged in such aerosol containers include insecticides, paints, cosmetics, deodorizers, butane fuel, lubricants and others.

As part of the quality control procedures used by commercial firms that produce large quantities of products packaged in aerosol containers, the pressure levels within aerosol containers picked out as samples from a production line are routinely tested. The equipment and procedures used heretofore in testing such pressure levels have resulted in small amounts of the contents of the tested aerosol containers being dispensed, thereby contaminating both the container valves and the valve adapters forming part of the pressure testing equipment. When the container contents are paints and certain other products, the contamination of the container valves usually requires discarding of the tested aerosol containers and the clean-up of the adapter head.

SUMMARY OF THE INVENTION

In accordance with the present invention, an apparatus and method are provided whereby the pressure levels within pressurized containers, particularly aerosol containers, may be readily tested without dispensing product or contents from the aerosol containers thereby eliminating loss of product and the necessity of discarding a tested aerosol container or the clean-up of the testing equipment.

The pressure testing equipment of the invention includes a so-called head in which a pressure charge is isolated in a small chamber. An inlet valve allows the pressure charge to be introduced into the small chamber and isolated therein. An outlet poppet valve forms a pressure release connection between the small chamber and a passageway to the valve of the pressurized container. When mating between a valve adapter on the pressure tester head and the valve on a pressurized container is completed, a connection is completed between the small chamber in the head and the interior of the container being tested.

Since the pressure of the charge isolated in the head is intentionally slightly higher than the highest expected pressure to be encountered in testing the aerosol or other pressurized containers, the pressure in the small chamber in the head will rapidly equalize to the pressure in the container and the resulting equalized pressure can be sensed by a pressure sensor or transducer of known type suitably connected to a port in the small chamber.

While standard valve adapters commonly used to fill and load aerosol containers by the through-the-valve procedure may also be used in practicing the present invention, it is preferred to use a valve adapter provided by the present invention which precludes contents of a container being tested from being dispensed either into the valve mechanism of the container or into the adapter of the pressure testing equipment.

In view of the foregoing, the object of the invention, generally stated, is the provision of an economical and reliable apparatus and method for testing the pressure levels within pressurized containers without dispensing the contents of the containers during the testing procedure, thereby avoiding fouling or contaminating either the valve on the container or the equipment being used to conduct the pressure tests.

Other object of the invention will be apparent from the following detailed description of preferred embodiments thereof taken in connection with the accompanying drawings, wherein:

DESCRIPTION OF THE PREFERRED EMBODIMENTS

Figure 1:
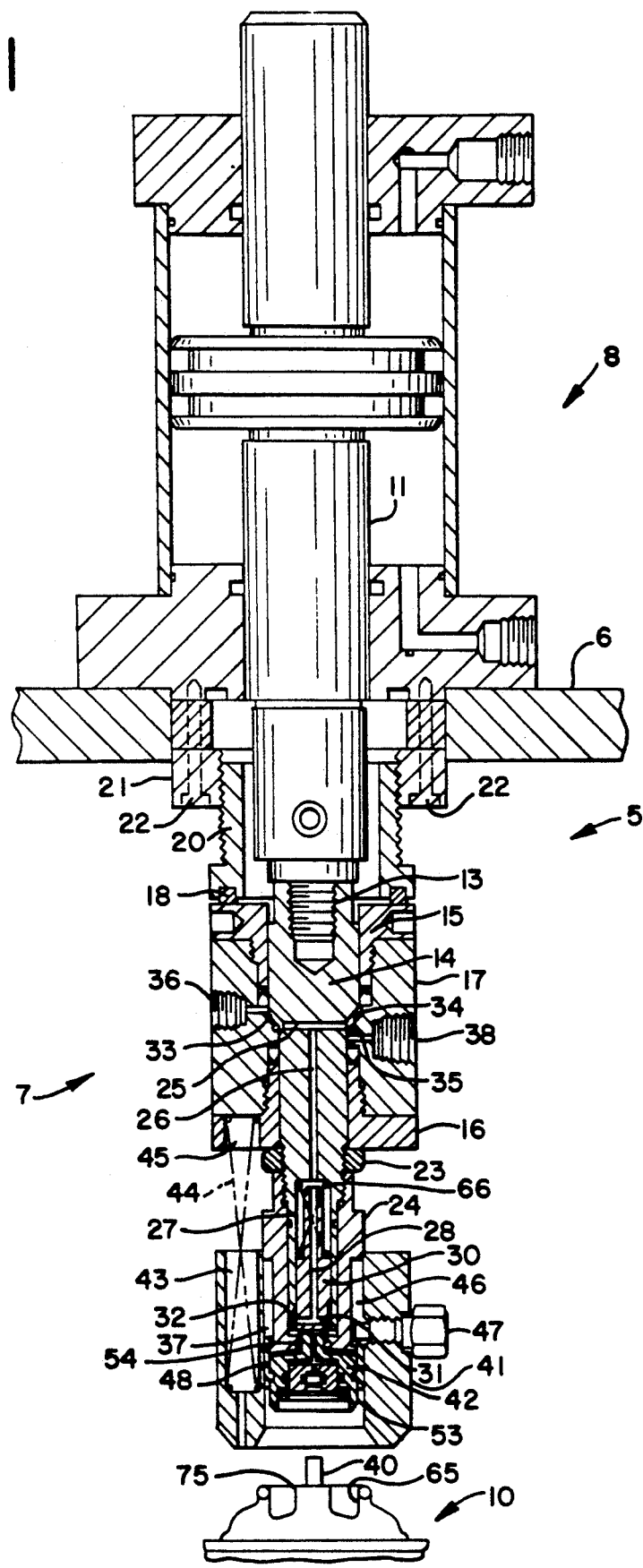
FIG. 1 is a view partly in vertical section and partly in elevation showing a pressure tester apparatus embodying the present invention.

Referring to FIG. 1, a pressure tester embodying the present invention is indicated generally at 5 which may be referred to as a pressure tester head. The tester or head 5 is suitably mounted on a support 6. The pressure testing mechanism extends below the support 6 and is indicated generally at 7. A double acting cylinder is operatively connected to the mechanism 7 as indicated generally at 8 and extends above the support 6. In operation, the cylinder 8 serves to raise and lower the mechanism 7 with respect to the pressurized containers to be tested, the top of an aerosol container being indicated generally at 10. The lower piston rod 11 has on its lower end a boss 13 which screws into the upper end of a vertically reciprocable valve spool 14. The upper portion of the spool 14 reciprocates within an upper bushing 15 while the adjoining smaller diameter, lower portion of the spool 14 reciprocates within a lower bushing 16. The bushings 15 and 16 are screwed into the upper and lower ends respectively, of a valve body 17 and together form a valve body assembly.

The upward movement of the valve body 17 and bushings 15 and 16 is stopped when the top of the upper bushing 15 engages a bumper 18 mounted in the lower end of a threaded sleeve 20 which adjustably screws into a support ring 21 secured to the stationary bottom end of the cylinder 8 by a plurality of bolts 22.

The valve body 17 is supported on the spool 14 by a nut 23 which engages the underside of the lower bushing 16. The nut 23 is screwed onto a threaded portion of the spool 14.

The purpose and function of the mechanism 7 is to isolate small volume pressure charges which are used to equalize to the pressure level within the aerosol container 10 and allow this pressure level to be measured. The small volume chamber in which such pressure charges are isolated and contained is formed by several interconnected passageways including: an inclined transverse bore 25 in the spool 14 which midway communicates with the upper end of a vertical axial bore 26 extending downwardly to the upper end of a hollow chamber 27 formed in the lower end of the spool 14; the vertical bore 28 in a poppet valve member 30; the transverse bore 31 at the bottom end of the poppet member 30; and the narrow circumferential chamber 32 formed by the annular space between the lower end of the poppet valve member 30 and the lower end of the spool 14.

In order to introduce and isolate pressure charges into the multi-passageway pressure chamber, the spool 14 is provided with a frusto-conical valve seat 33 which mates with a corresponding frusto-conical valve seat 34 formed in the valve body 17. The lower end of the valve seat 34 is provided with an O-ring seal 35.

Figure 2:
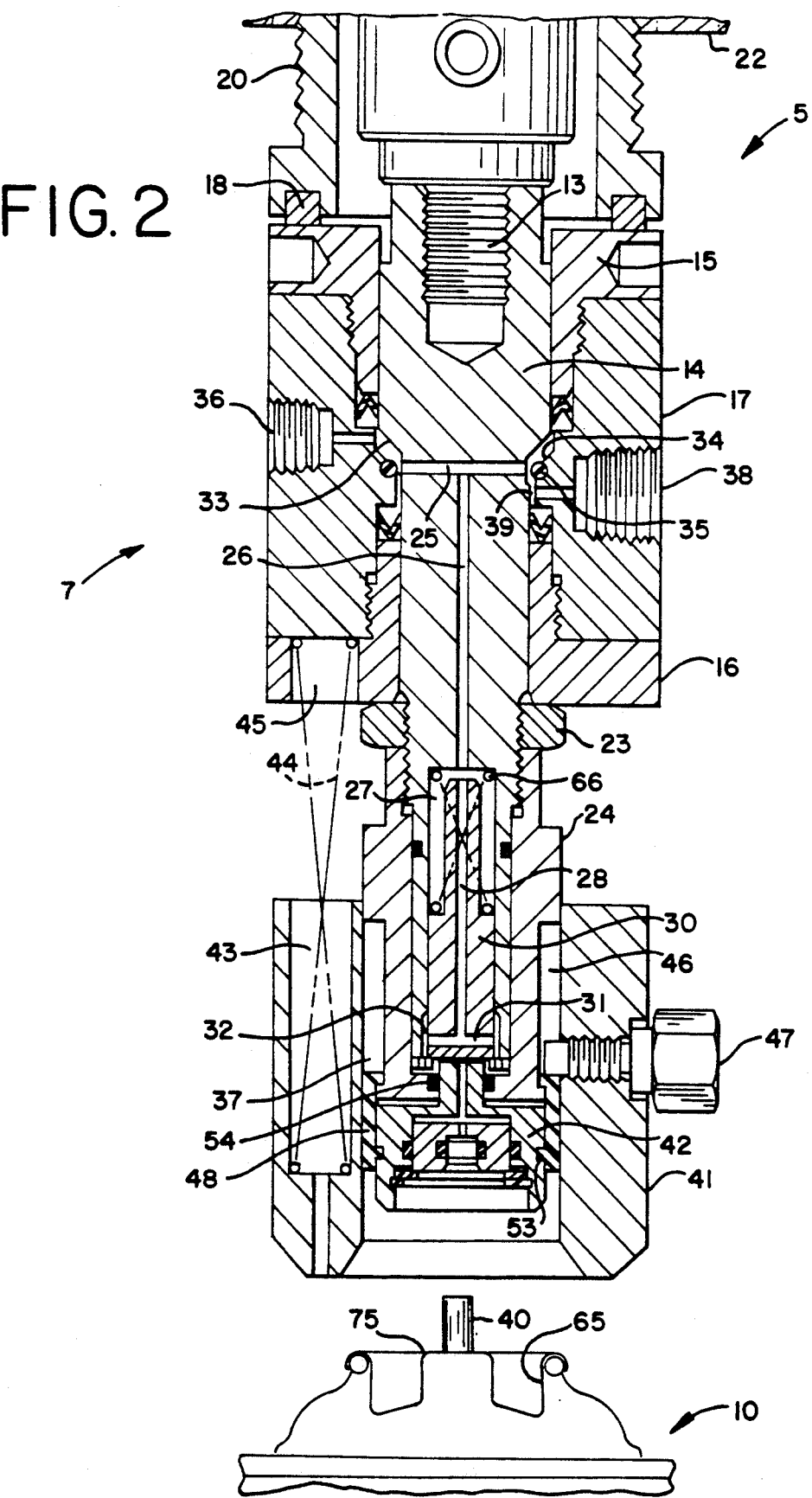
FIG. 2 is a vertical sectional view showing the lower portion of the tester of FIG. 1 on an enlarged scale.

The relative positions between the nut 23 threaded onto the spool 14 and the sleeve 20 within the support ring 21 are adjusted so that on the upper stroke of the cylinder 8, the upward movements of the valve spool 14 and the valve body 17 will stop with the valve seats 33 and 34 separated as shown in FIGS. 1 and 2. The resulting frusto-conical space formed between the valve seats 40 allows a pressure charge to be introduced through the side port 36. The pressure charge fills the various parts or passageways forming the small volume pressure isolation chamber within the valve spool 14 and the poppet valve 30. A ring seal 37 seated in the sleeve 24 serves to seal the bottom end of the pressure chamber.

Figure 3:
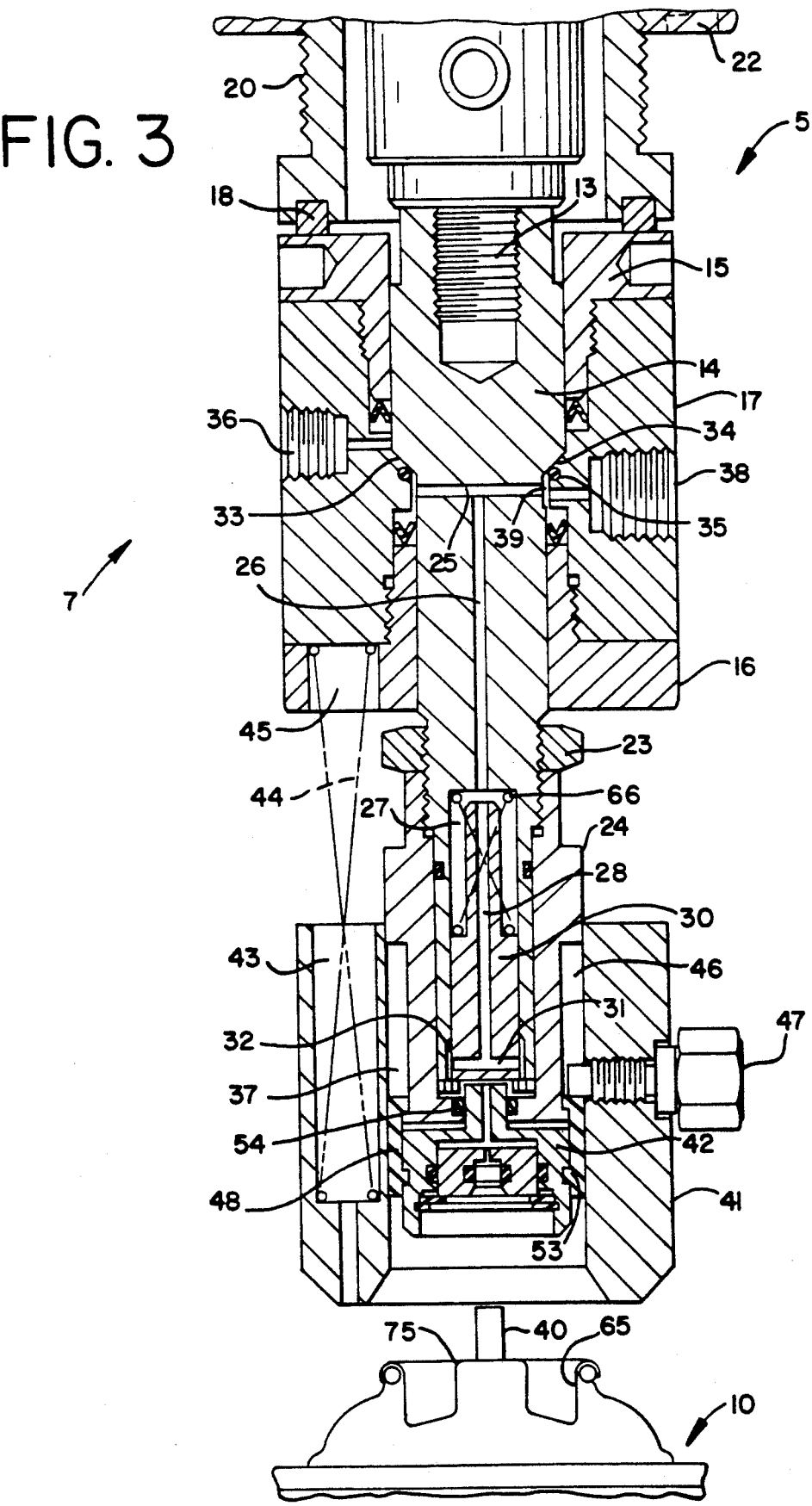
FIG. 3 is a view similar to FIG. 2 but showing the condition of the pressure tester after a pressure charge has been isolated.

With the pressure charge introduced into the small chamber provided in the mechanism 7, the mechanism is charged and ready to measure the pressure level within the container 10. In performing this function, the cylinder 8 is actuated so as to lower the mechanism 7 onto the upper end of the aerosol container 10. Upon the downward stroke of the cylinder mechanism 7, the valve seat 33 closes onto the O-ring seal 35 thereby isolating the pressure port 36 from the pressure chamber within the mechanism 7. The pressure sensor or transducer port 38 communicates with the transverse bore 25 and in turn, the multi-component pressure chamber by way of the clearance or gap 39 provided between the spool 14 and valve body 17. Since the port 38 is always in communication with the bore or chamber 25 when the spool 14 is all the way up a pressure transducer (not shown) connected to port 38 can be used to calibrate the transducer by applying a known charge pressure. Port 38 is also convenient to check charging pressure and functioning of the head. The relationship of the parts during this first downward movement is shown in FIG. 3.

Figure 6:
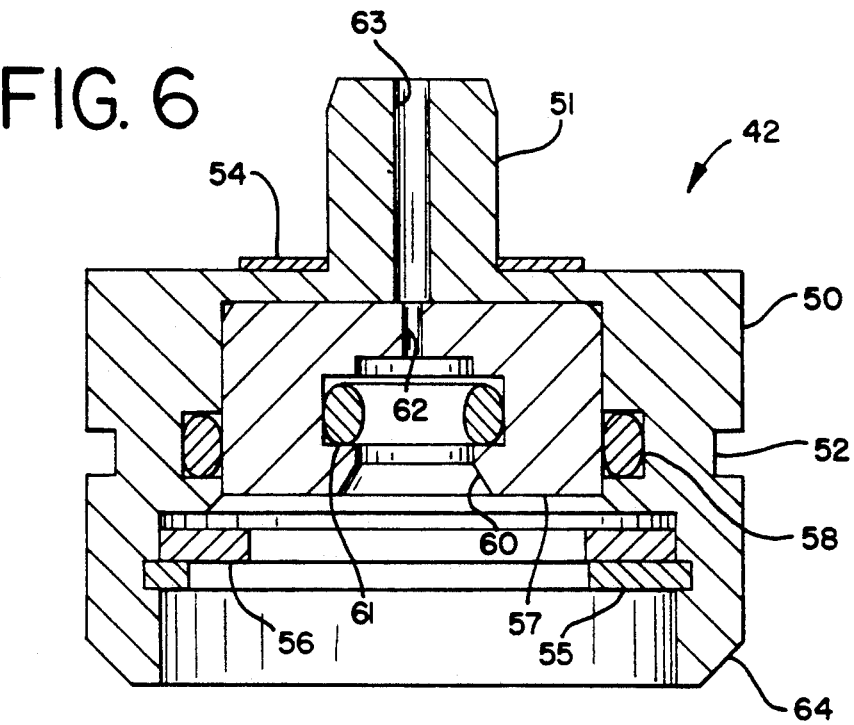
FIG. 6 is a vertical sectional view on an enlarged scale of the through the stem adapter forming a part of the apparatus shown in the FIGS. 1–5.

In order to provide proper seating of the mechanism 7 on the upper end of the aerosol container 10 and form a mating seal with the valve stem 40 on the container, a can locator 41 is mounted for vertical reciprocation on the sleeve 24. An adapter indicated generally at 42 in FIG. 6 is mounted in the lower portion of the locator sleeve 41. The upper end of the can locator sleeve 41 is vertically reciprocable on the sleeve 24 and is provided with a plurality of downwardly extending sockets 43 in which are seated the lower ends of compression springs indicated diagrammatically at 44 the upper ends of which seat in sockets 45 formed in the underside of the bushing 16. The springs 44 serve to bias the can locator 41 downwardly with respect to the valve body 17. The side of the sleeve 24 is provided with a circumferential groove 46 which receives the inner end of a screw 47 carried by the sleeve 41. Within the lower portion of the sleeve 41, a container locating sleeve 48 is mounted the upper end of which is in-turned so as to rest on the bottom of the groove 46. It will be seen that the engagement between the inner end of the screw 47 and the in-turned top of the sleeve 48 prevents the sleeve 41 from separating from the sleeve 24.

Referring to FIG. 6, the adapter 42 has a cylindrical body 50 with an integral stem 51 projecting from the top. The body 50 is provided with a circumferential groove 52 which receives a flange 53 (FIG. 2) formed on the interior of the sleeve 48 thereby interconnecting the adapter 42 to the sleeve 48 and in turn to the lower end of the sleeve 24.

The upstanding stem 57 on the adapter 42 fits slidably within an opening provided therefore in the bottom end of the sleeve 24. A seal 54 fits over the stem 51 and provides a seal between the adapter 42 and the sleeve 24.

On its interior, the adapter body 50 is provided with a ring 55 which seats within a groove in the valve body 50 and which supports a washer 56 which in turn provides bottom support for a vertically reciprocable piston 57 when it is in its lowered position. An O-ring 58 provides a seal between the piston 57 and the interior recess in the valve body 50 in which it is seated.

The piston 57 is provided with a valve stem receiving socket or opening 60 for receiving the valve stem 40 on the aerosol container 10. An O-ring seal 61 carried on the interior of the opening 60 provides a sliding seal with the valve stem 40. A vertical passageway 62 in the piston 57 provides a connection between the opening or recess 60 and a passageway 63 in the upstanding stem 51 on the adapter body 50.

The valve body 50 is provided on the bottom with a circumferential locator flange 64 which enters the valve cup 65 on the container 10 and positively centers the valve cup with respect to the adapter 42 as mating engagement is completed therebetween. Prior to the entry of the flange 64 into the valve cup 65, the lower end of the outer sleeve 41 will have seated on the valve cup outside shoulder. Thus, the outer sleeve 41 and the flange 64 on the adapter 42 cooperate to accurately center and seat the adapter 42 on the valve cup 65 with the valve stem 40 protruding into the adapter recess 60.

Figure 5:
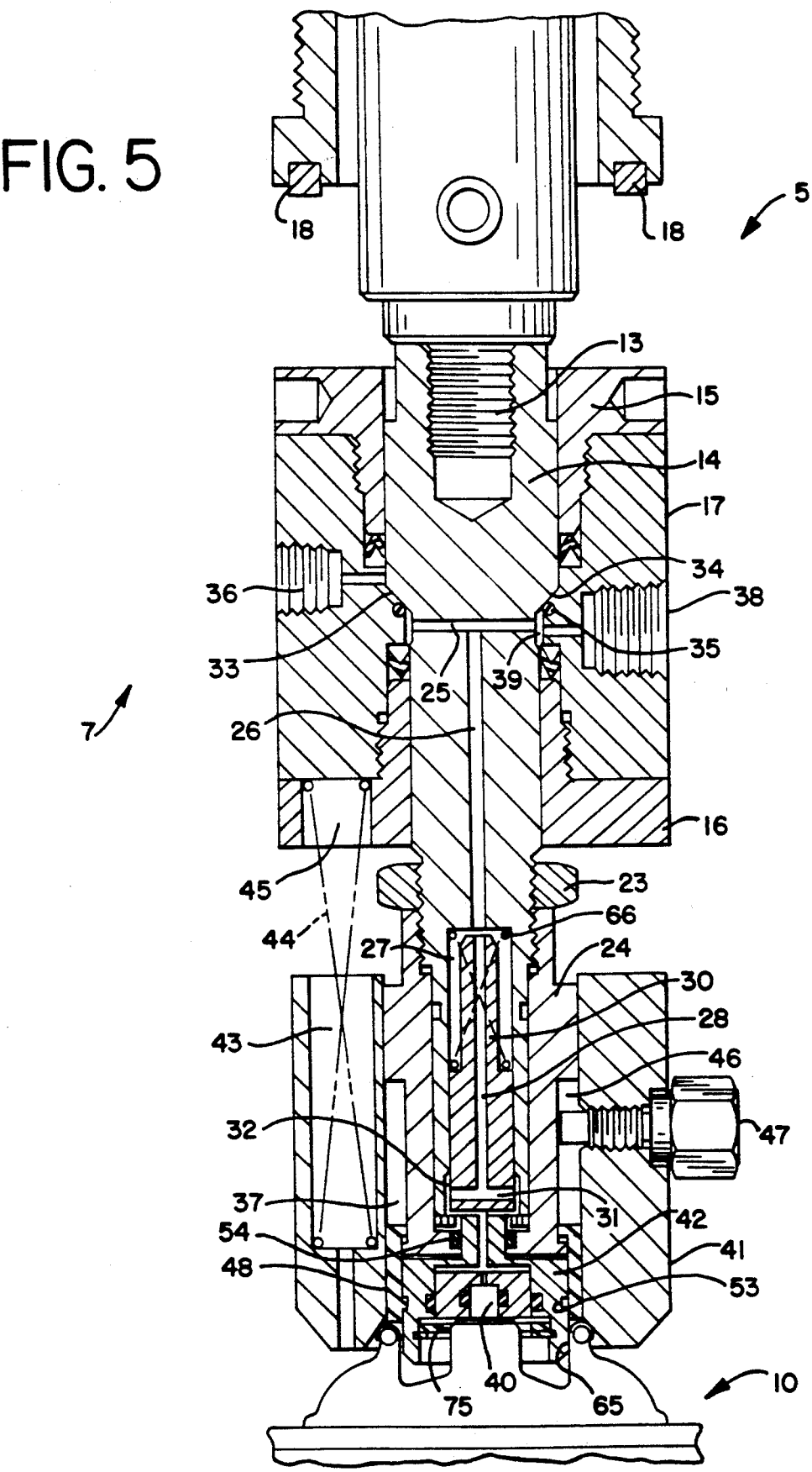
FIG. 5 is a view similar to FIG. 4 and showing the condition of the completely mated parts during the testing of the pressure in the aerosol container.

In order to release the pressure charge isolated in the mechanism 7, the poppet valve 30 is lifted from its seat, against the downward force provided by a compression spring diagrammatically indicated at 66. When the upstanding stem 51 on the adapter 42 initially engages the underside of the poppet 30, the adapter piston 57 will be in its upper position as shown in FIG. 6. As soon as the poppet 30 is lifted off from its seat by the stem 51, it will be seen that a pathway is provided for release of the isolated pressure charge through the openings 31, 32 into the passageways 63 and 62 in the adapter 42. The pressure of the released charge acts on the top of the piston 57 and forces it down a small distance as shown in FIG. 5 which is sufficient to actuate the valve stem 40 on the container 10 and thereby connect the pressure charge with the opening in the valve stem 40. Once the pressure charge isolation chamber of the mechanism 7 is thus placed in communication with the interior of the aerosol container 10 through its valve stem 40, the small volume pressure charge rapidly equalizes to the level of the pressure with the container 10. This pressure level is sensed by a pressure sensor or transducer (not shown) connected with the port 38.

In commercial production, aerosol containers such as 10 are charged or filled with propellant by one of two known procedures and corresponding equipment. In one method and type of equipment, the propellant is introduced into the container through the valve using a pressure filler. With this method and type of equipment, the valve cups will have been crimped or sealed to the top openings in the containers prior to the introduction of propellant. The second method of filling and type of equipment are known as the under-the-cup method and undercup filler. In this method, the propellant is introduced with the valve cup or closure lifted, after which the valve cup is crimped or sealed in place. Both methods and types of equipment are well known and in commercial use. The through-the-valve method and equipment, for example, are shown and described in Pat. 3,013,591 dated Dec. 19, 1961. The under-the-cup method and equipment are shown and disclosed, for example, in Pat. 3,157,974 dated Nov. 24, 1964.

The adapter 42 may be utilized in testing aerosol containers which utilize aerosol valves designed to be filled through the stem, whether filled with propellant by either through-the-valve method and equipment or by the under-the-cup method and equipment. However, some aerosol containers utilize valves which are designed to be filled around the stem using a standard adapter of known type in place of the adapter 42. One such standard adapter is indicated generally at 70 in FIG. 7. The adapter 70 comprises an adapter body 71 with an upstanding stem 72. In use, the adapter is seated on an aerosol container 10 with the valve stem 40 received in the chamber 73 and with a seal being formed between the gasket 74 and the valve pedestal 75. Since the adapter 70 is not equipped with a piston or means for releasing the pressure charge in the tester 5 before the valve 40 of the aerosol container 10 is actuated, it is possible for some of the contents of the aerosol container to enter the valve 40 and the adapter 70 before the container pressure is equalized with the pressure charge. If the product in the container being tested is paint or a similar contaminating product, the container valve 40 and the adapter 70 may become fouled with the product necessitating discard of the container and cleansing of the adapter. In general, a standard adapter such as 70 cannot be used in testing the pressure levels in containers filled with contaminating type products.

Figure 4:
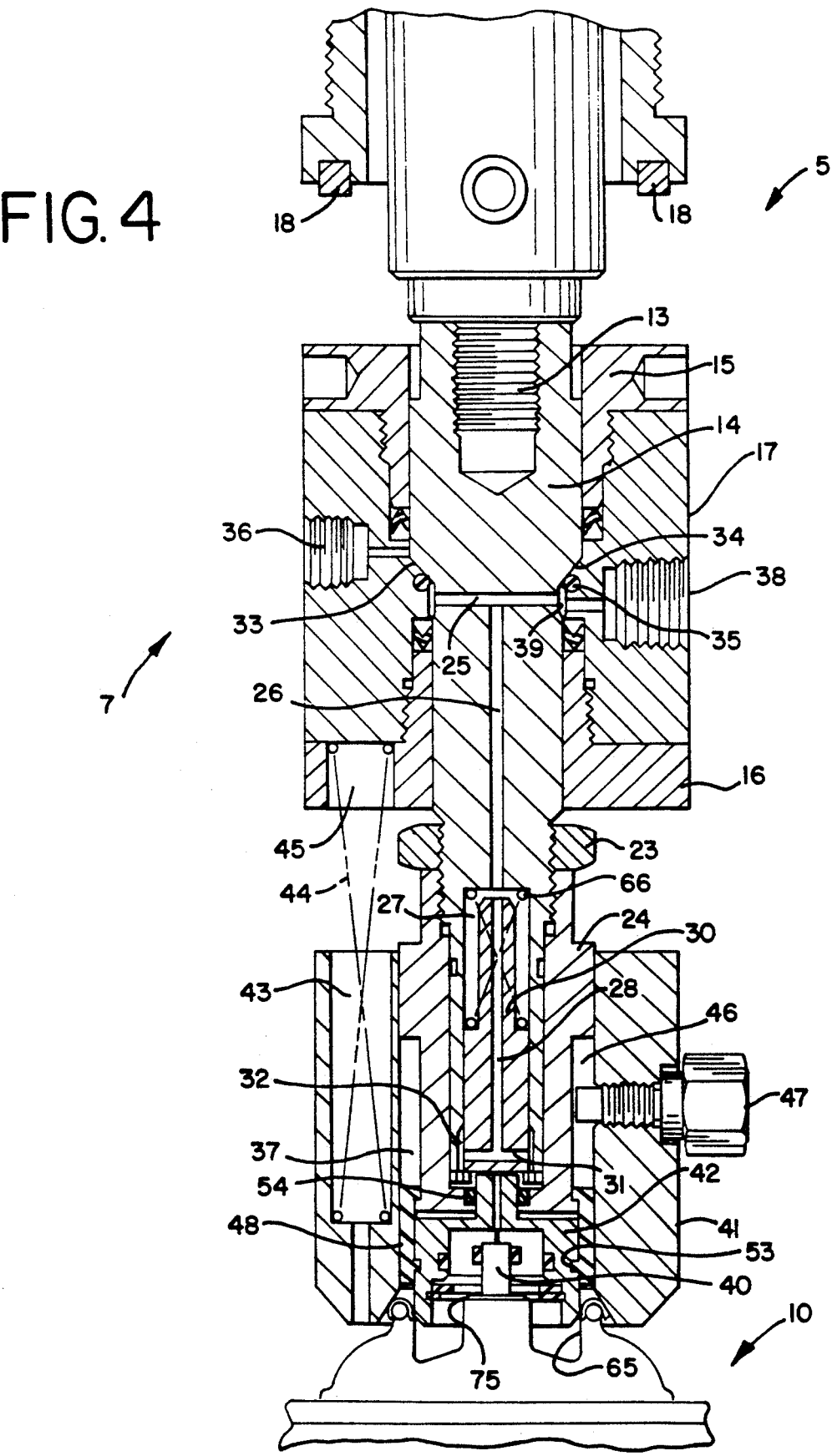
FIG. 4 is a view similar to FIG. 3 but showing the adapter on the pressure tester partially mated with an aerosol container and its valve stem.

The operation of the pressure tester 5 may be summarized as follows. In a typical set-up associated with a commercial aerosol filler line, aerosol containers 10 which have already been filled with product and propellant will be delivered to a predetermined position directly underneath the pressure tester 5. The double acting cylinder 8 is then actuated to lower the mechanism 7. As the mechanism 7 starts to move down, the valve seat 33 on the spool 14 seats on the valve seat 34 and O-ring seal 35 as shown in FIG. 3, thereby isolating the pressure charge introduced from the port 36 into the upper end of bore 25. The mechanism or head 7 continues to move down with the can locator 41 contacting the exterior of the valve cup 65 and with the flange 64 of the adapter 42 entering the valve cup as shown in FIG. 4. During this downward movement the valve stem 10 will have entered the adapter 42 and the O-ring seal 61, thereby lifting the piston 57 to its upper position. Continuous downward movement of the mechanism or head 7 causes the gasket sleeve 48 to seat on the rim of the valve cup 65 and the stem 51 to actuate the poppet valve 30. As described above, when the poppet valve 30 is actuated or lifted, the pressure charge within the chamber of the mechanism 7 is released and forces the piston 57 down which in turn depresses the valve stem 40 thereby actuating the valve of the aerosol container 10. The condition of the parts when these functions occur is shown in FIG. 5. The pressure within the chamber of the head 7 is equalized to the pressure within the aerosol can allowing the pressure level in the aerosol container 10 to be measured.

It will be noted that each pressure charge isolated in the head or mechanism 7 will fill all communicating passages and spaces before the valve stem 40 is depressed and actuated. Since the pressure charge is adjusted higher than the expected pressure within the container 10 the higher pressure prevents product from entering either the valve stem 40 or the adapter 42 during testing.

Figure 7:
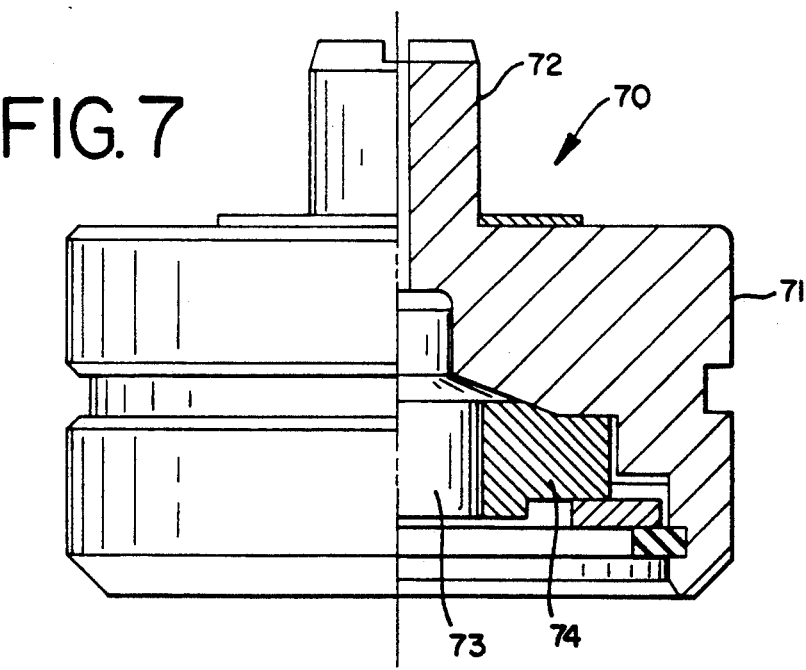
FIG. 7 is a vertical sectional view of a standard around the stem adapter such as used in known through-the-valve pressure filling machines and which may be used in the apparatus shown in FIGS. 1–5 in testing the pressure levels within certain types of aerosol containers.

While gas is normally used as the fluid to form the small volume pressure charges in operating the pressure tester 5, suitable liquids may also be used. It will also be understood that by isolating a vacuum within the tester 5 it may be used to measure vacuum levels within aerosol containers. An adapter such as shown in FIG. 7 would be used for testing a vacuum.

Figure 8:
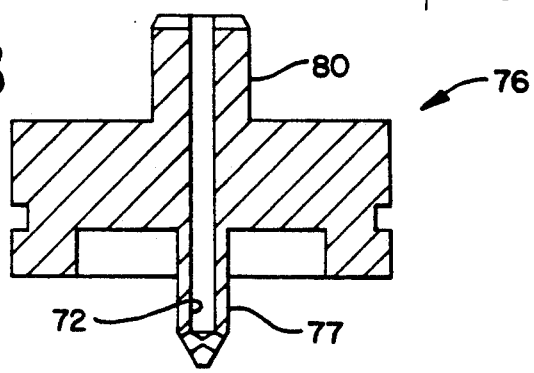
FIG. 8 is a vertical sectional view through a piston which can be used in the through the stem adapter of FIG. 6 to convert it to interface with a pressurized container equipped with a stemless valve instead of a valve equipped with a stem.

Some containers have aerosol valves which do not have protruding valve stems 40. The pressure tester 5 can be used to measure pressure levels in such containers by using a male adapter having female actuator interface with the aerosol valves of these aerosol containers. Referring to FIG. 8 a piston is indicated generally at 76 which can be used to convert the adapter 42 (FIG. 6) from a female adapter to a male adapter by replacing piston 57. The piston 76 has a downwardly protruding stem 77 which enters and actuates the female valves on containers equipped with such valves. The passageway 78 in the stem 77 extends upwardly through the piston 76 including the stem 80.

What is claimed is:

1. Apparatus for testing the pressure levels within pressurized containers that have valves which are actuatable from the exterior to provide pressure transmitting connections through the valves into containers being tested, comprising, a pressure charge isolator having a small volume chamber for receiving and isolating therein a small discrete volume charge of pressurized fluid, said isolator having inlet and outlet connections, first valve means operatively connected with said isolator for alternately connecting said inlet connection to and disconnecting said inlet connection from a source of pressurized fluid, second valve means operatively connected with said isolator for opening and closing said outlet connection, a pressure sensing port in communication with said chamber for sensing the pressure level therein, and adaptor means operatively connected with said second valve means and operatively engageable with the valve of a pressurized container being tested so as to form a sealed pressure transmitting connection between the interior of the pressurized container and said small volume chamber whereby the discrete isolated pressure charge within said small volume chamber when released equalizes to the pressure within the pressurized container and the equalized pressure may be sensed at said pressure sensing port.

2. Apparatus for ascertaining the pressure levels within pressurized containers that have valves which are actuatable from the exterior to provide pressure transmitting connections through the valves of containers being tested into the container interiors, comprising,

- a sleeve-like valve body having a through-bore which has a lower bore section joined at its upper end by a female circumferential valve seat to the lower end of a larger diameter upper bore section,
- a valve spool reciprocable within said bore of said valve body and having a lower spool section reciprocally interfitting within said lower bore section and joined at its upper end by a male circumferential valve seat to the lower end of an upper spool section reciprocally interfitting within said upper bore section said male valve seat being matable with said female valve seat,
- a protruding spool extension on the lower end of said lower spool section which protrudes below said sleeve-like valve body and which has a hollow lower end,
- a vertically unseatable poppet valve member housed within said hollow lower end of said protruding spool extension,
- a pressurized container-engaging adapter operatively connected to the lower end of said protruding spool extension for mating engagement with a pressurized container and actuation of its valve, and
- means for producing relative axial movement between said valve body and said spool and between said apparatus and a pressurized container to produce said mating engagement between said adapter and container for actuation of its valve,
- said valve body having a pressure inlet port connected to the annular space which is formed between said male and female circumferential valve seats when separated,
- said valve spool having a transverse inlet passageway which communicates with said annular space and which connects with the upper end of an axial passageway in said spool which at its lower end opens into said hollow lower end of said spool, and
- said poppet valve member having an axial passageway therein which at its upper end communicates with the upper portion of the hollow space in the hollow lower end of said protruding spool extension and which at its lower end communicates with an outlet passageway in said poppet valve member which in turn opens into a pressure outlet passageway formed between the lower end of said poppet valve member and the interior of the bottom end of said lower hollow end of said spool which last mentioned passageway is closed when said poppet valve is seated and which is opened when said poppet valve is unseated so as to communicate with said adapter and in turn with said pressure transmitting connection provided by said pressurized container valve.

3. The apparatus called for in claim 2 wherein said sleeve-like valve body includes upper and lower bushings with said lower spool section reciprocally interfitting within said lower bushing and said upper spool section reciprocally interfitting within said upper bushing.

4. The apparatus called for in claim 2 wherein said matable female circumferential valve seat and said matable male circumferential valve seat are frusto-conical in shape and one of said seats carries a resilient rubber-like gasket to form a pressure tight seal therebetween.

5. The apparatus called for in claim 2 wherein said sleeve-like valve body is suspended from said valve spool by a nut carried by the upper end of said protruding spool extension.

6. The apparatus called for in claim 2 wherein said protruding spool extension including its lower end and extending upwards therefrom a substantial distance is enclosed within an outer sleeve mounted on said protruding spool extension.

7. The apparatus called for in claim 2 wherein the upper end of said poppet valve member is appreciably smaller in diameter than the hollow interior of said hollow lower end of said protruding spool extension thereby leaving a compression spring receiving space between the exterior of said upper end of said poppet member and said hollow end interior, and a poppet compression spring is located in said spring receiving space and axially compressed between the upper end of said hollow end interior and a shoulder formed on said poppet member at the lower end of said smaller diameter upper end of said poppet valve member.

8. The apparatus called for in claim 7 wherein the combination of said transverse inlet passageway in said spool, said axial passageway in said spool, said poppet compression spring receiving space, said axial passageway in said poppet valve member, said outlet passageway in said poppet valve member, and said last mentioned pressure outlet passage cumulatively form a relatively small isolation chamber in which a charge of fluid under pressure can be isolated.

9. The apparatus called for in claim 8 wherein there is a pressure sensing port in communication with said small chamber in which a charge of fluid under pressure may be isolated.

10. The apparatus called for in claim 9 wherein said pressure sensing port communicates continuously with said transverse inlet passageway in said spool.

11. The apparatus called for in claim 8 wherein said last mentioned passageway formed between the lower end of said poppet valve member and the interior of the bottom end of said lower hollow end of said spool is annular.

12. The apparatus called for in claim 11 wherein said last mentioned annular passageway is opened when said poppet valve member is unseated.

13. The apparatus called for in claim 6 wherein a container locator is suspended for vertically reciprocal interfitting movement on said outer sleeve mounted on said protruding spool extension.

14. The apparatus called for in claim 2 wherein said means for producing relative axial movement between said apparatus and a pressurized container comprises a double-acting cylinder is mounted on a fixed support and operatively connected to the upper end of said spool.

15. The apparatus called for in claim 2 wherein said pressurized container-engaging adapter comprises an adapter body in the form of a cylinder open at the bottom and having an upstanding stem on its top receivable in pressure-tight interfitting relationship within an opening provided therefor in said apparatus, and a piston disposed for axial reciprocation within said adapter body having a formation thereon for forming a fluid-tight actuating connection with said valve on said container, said upstanding stem and said piston having communicating passageways therein terminating at the upper end of said upstanding stem and terminating at the bottom end in said formation on said piston.

16. The apparatus called for in claim 15 wherein said formation on said piston is a bottom opening cavity for receiving in fluid-tight actuating relationship therein a valve stem on a pressurized container.

17. The apparatus called for in claim 15 wherein said formation on said piston is a downwardly protruding stem for entering in fluid-tight actuating relationship a female valve on a pressurized container 18. An adapter for providing a fluid tight passageway between a female pressure discharge connection on apparatus having a chamber in which charges of pressurized fluid may be isolated and the valve on a pressurized container actuatable from the exterior to provide a pressure transmitting connection into the container, comprising, an adapter body in the form of a cylinder open at the bottom and having an upstanding stem on its top receivable in pressure-tight interfitting relationship within said female pressure discharge connection of said apparatus, and a piston disposed for axial reciprocation within said adapter body having a formation thereon for forming a fluid-tight actuating connection with said valve on said container, said upstanding stem and said piston having communicating passageways therein terminating at the upper end of said upstanding stem and terminating at the bottom end in said formation on said piston.

19. The adapter called for in claim 18 wherein said formation on said piston is a bottom opening cavity for receiving in fluid-tight actuating relationship therein a valve stem on a pressurized container.

20. The adapter called for in claim 18 wherein said formation on said piston is a downwardly protruding stem for entering in fluid-tight actuating relationship a female valve on a pressurized container.

21. The method of testing the pressure level within a pressurized container having a valve which is actuatable from the exterior to provide a pressure transmitting connection through the valve into the container comprising, isolating a small discrete charge of fluid in a chamber under a pressure greater than the pressure level in the pressurized container, connecting said chamber in pressure transmitting relationship with the valve of a pressurized container being tested, actuating the valve to form a pressure transmitting connection between the interior of said chamber and said pressurized container, and sensing the value of residual pressure in said chamber, the volume of said small discrete isolated charge relative to pressure charge in said container being such that the pressure in said chamber equalizes to substantially the pressure level in said container.

22. The method of claim 21 wherein the pressure on said small charge of fluid in said chamber is released into said valve before said valve is actuated.

* * * * *